US011707902B2

(12) United States Patent
Asaga et al.

(10) Patent No.: US 11,707,902 B2
(45) Date of Patent: Jul. 25, 2023

(54) SEAL MEMBER FORMING SYSTEM AND METHOD

(71) Applicant: NORDSON CORPORATION, Westlake, OH (US)

(72) Inventors: Nobuyuki Asaga, Tokyo (JP); Yoshimi Yonemoto, Tokyo (JP)

(73) Assignee: Nordson Corporation, Westlake, OH (US)

(*) Notice: Subject to any disclaimer, the term of this patent is extended or adjusted under 35 U.S.C. 154(b) by 528 days.

(21) Appl. No.: 16/636,932

(22) PCT Filed: Jul. 23, 2018

(86) PCT No.: PCT/US2018/043290
§ 371 (c)(1),
(2) Date: Feb. 6, 2020

(87) PCT Pub. No.: WO2019/032269
PCT Pub. Date: Feb. 14, 2019

(65) Prior Publication Data
US 2020/0361167 A1   Nov. 19, 2020

(30) Foreign Application Priority Data
Aug. 9, 2017 (JP) ................... 2017-153754

(51) Int. Cl.
*B29C 33/40* (2006.01)
*B29D 99/00* (2010.01)
(Continued)

(52) U.S. Cl.
CPC .......... *B29D 99/0053* (2013.01); *B29C 33/40* (2013.01); *B29C 35/0888* (2013.01);
(Continued)

(58) Field of Classification Search
CPC . B29C 33/40; B29C 44/1219; B29C 44/1271; B29C 2035/0827;
(Continued)

(56) References Cited

U.S. PATENT DOCUMENTS 5,885,514 A    3/1999  Tensor
10,022,744 B2 *  7/2018  Macindoe ............. B05C 5/0225
(Continued)

FOREIGN PATENT DOCUMENTS

| CN | 105140832 A | 12/2015 |
| JP | 07-076615 A | 3/1995 |
| JP | 10-230535 A | 9/1998 |
| JP | 2000133665 A * | 5/2000 |
| JP | 2000-263563 A | 9/2000 |
| JP | 2001-287229 A | 10/2001 |
| JP | 2003-154534 A | 5/2003 |
| JP | 2003-205537 A | 7/2003 |

(Continued)

*Primary Examiner* — Jeffrey M Wollschlager
*Assistant Examiner* — Xue H Liu
(74) *Attorney, Agent, or Firm* — BakerHostetler

(57) ABSTRACT

A system and method for forming a seal member onto a substrate from a material is disclosed. The system includes a mold comprising an ultraviolet transmissible material, the mold having a first portion and a second portion operatively coupled to the first portion, the first portion having a first cavity, a second cavity, and a channel extending from an outer surface of the mold to the second cavity. The first cavity has a first shape that is complementary to a first side of the substrate and the second cavity has a second shape that is complementary to the seal member. The system also includes an applicator in fluid communication with the channel, where the applicator is configured to provide the material to the second cavity through the channel, and an ultraviolet irradiation device configured to irradiate the mold with ultraviolet light to cure the material when the material is provided to the second cavity, such that the seal member is formed on the substrate.

12 Claims, 11 Drawing Sheets

(51) Int. Cl.
*B29C 35/08* (2006.01)
*B29C 44/12* (2006.01)
*B29K 33/00* (2006.01)
*B29K 63/00* (2006.01)
*B29K 83/00* (2006.01)
*B29L 31/26* (2006.01)

(52) U.S. Cl.
CPC ...... *B29C 44/1219* (2013.01); *B29C 44/1271* (2013.01); *B29D 99/0085* (2013.01); *B29C 2035/0827* (2013.01); *B29K 2033/08* (2013.01); *B29K 2063/00* (2013.01); *B29K 2083/005* (2013.01); *B29K 2995/0027* (2013.01); *B29L 2031/26* (2013.01)

(58) Field of Classification Search
CPC ............ B29K 2033/08; B29K 2063/00; B29K 2083/005; B29K 2995/0027; B29L 2031/26
See application file for complete search history.

(56) References Cited

U.S. PATENT DOCUMENTS

| | | |
|---|---|---|
| 2004/0239008 A1 | 12/2004 | Gottlieb et al. |
| 2008/0128955 A1 | 6/2008 | Lim et al. |

FOREIGN PATENT DOCUMENTS

| | | |
|---|---|---|
| JP | 2006-346939 A | 12/2006 |
| JP | 2007-015240 A | 1/2007 |
| JP | 2007-500633 A | 1/2007 |
| JP | 2007-294989 A | 11/2007 |
| JP | 2008-529833 A | 8/2008 |
| JP | 2008-213275 A | 9/2008 |
| JP | 2008-275970 A | 11/2008 |
| JP | 2010-131918 A | 6/2010 |
| JP | 5604054 B2 | 10/2014 |
| JP | 5695102 B2 | 4/2015 |
| JP | 2015-201593 A | 11/2015 |
| WO | 2010/064733 A1 | 6/2010 |

* cited by examiner

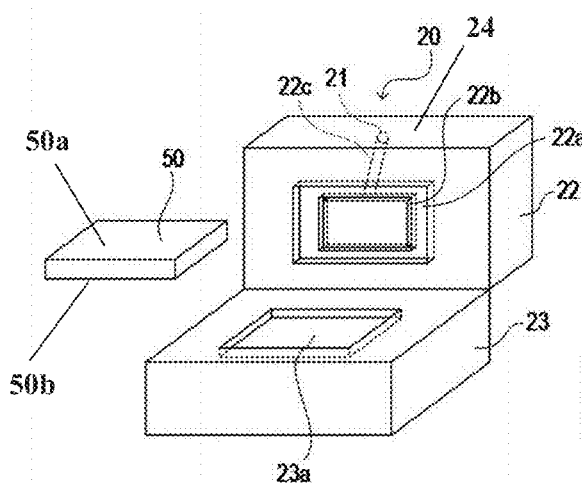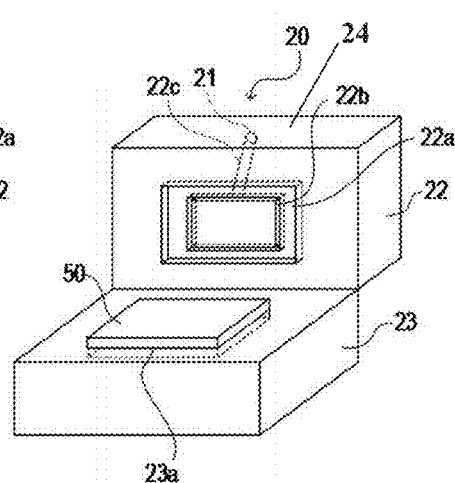
FIG. 9A  FIG. 9B
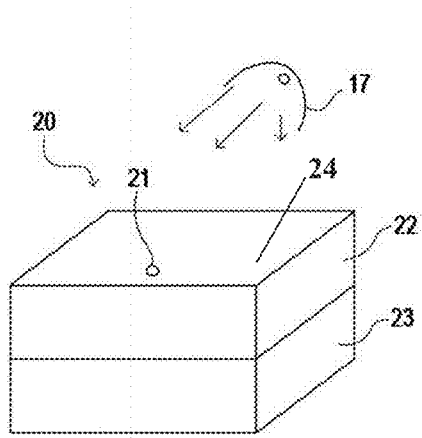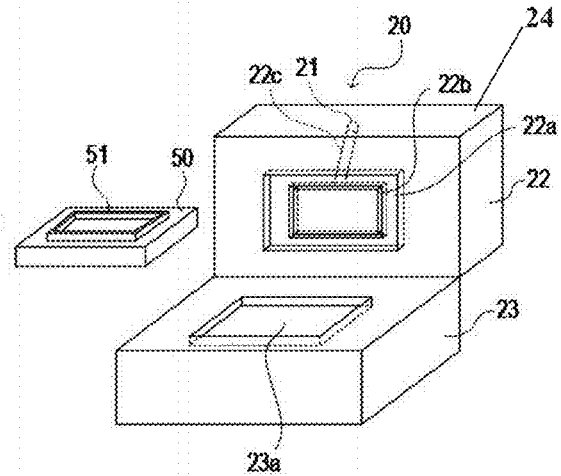
FIG. 9C  FIG. 9D

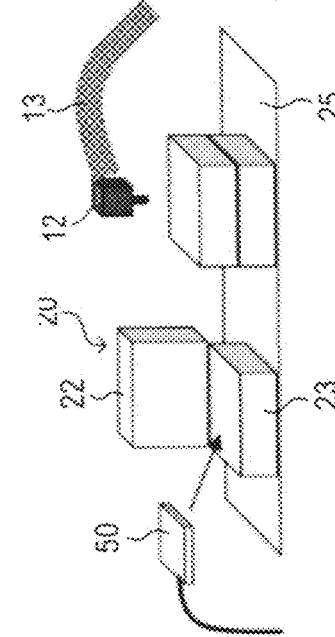
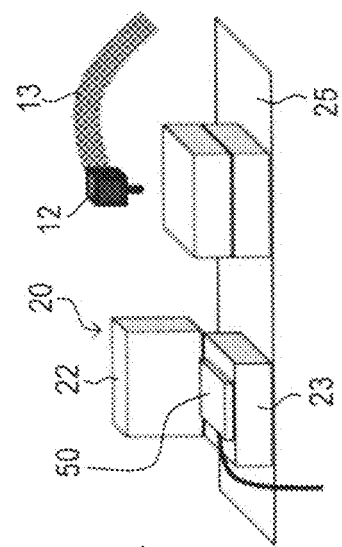
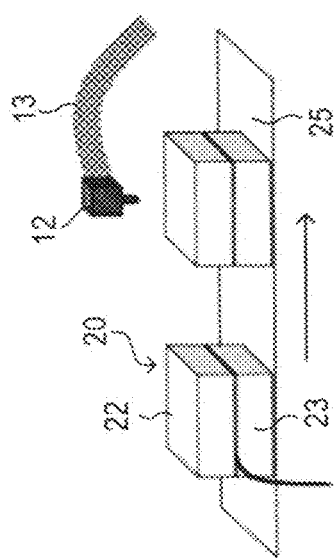
FIG. 10A  FIG. 10B  FIG. 10C
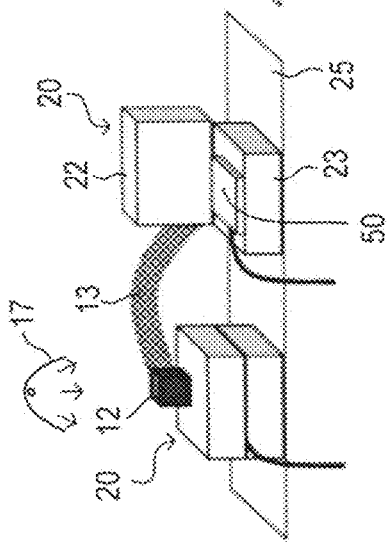
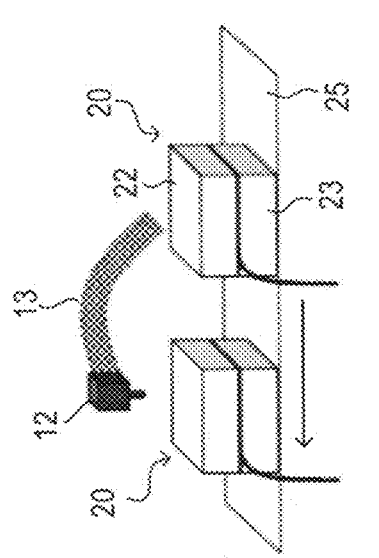
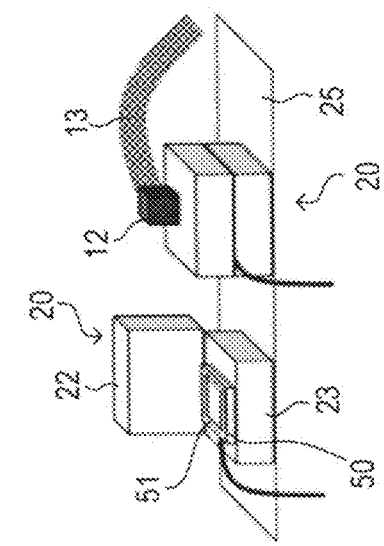
FIG. 10D  FIG. 10E  FIG. 10F

SEAL MEMBER FORMING SYSTEM AND METHOD

CROSS REFERENCE TO RELATED APPLICATIONS

This application is a National Stage of International Patent App. No. PCT/US2018/043290, filed on Jul. 23, 2018, which claims the benefit of Japanese Patent Application No. 2017-153754, filed Aug. 9, 2017, the disclosures of both of which are hereby incorporated by reference as if set forth in their entirety herein.

TECHNICAL FIELD

This disclosure relates to a system and method for forming a seal member on a substrate. In particular, this disclosure relates to a system and method for using an ultraviolet irradiation device to cure a material to form the seal member on the substrate.

BACKGROUND

Seal members (seals) are conventionally used in various machines such as automobiles, cellular phones, and business machines to provide air-tightness and/or liquid-tightness between two parts. Such seal members conventionally include gaskets that provide air-tightness and/or liquid-tightness between fixed parts of a machine and packings that provide air-tightness and/or liquid-tightness between parts moving relative to each other.

Various other types of seal members exist. O-rings are seal members that are configured to be fitted in a pre-formed target portion. Foam tape is used as a seal member configured to be applied to a target part by being made to fit to the shape of that part. In addition, a method known as formed-in-place gasket (hereinafter, simply referred to as the "FIPG") application is known where beads of a liquid seal material are applied to surfaces of the target parts and then the parts are bonded together. Moreover, an increasingly popular method of gasket forming on a part is gasket forming by liquid injection molding (simply referred to as the "LIM forming"), which employs a high-performance 2K silicone material. To be more specific, in a commonly employed method in the LIM forming process, a part is manufactured with a thermoplastic material through an injection molding step and then, in a separate step, a gasket is formed on that part with a heat-curable material (silicone resin, etc.). In addition, a recently developed composite forming machine is capable of performing both of the above-mentioned steps simultaneously.

It is, however, difficult to automate the work of fitting O-rings to target parts and the work of applying foam tapes to target parts. Hence, such work needs to be done manually and this labor-intensive work tends to be done only at higher costs. In contrast, an FIPG application may be performed in a completely automated process. It is, however, difficult to appropriately control the heights and shapes of the beads applied in FIPG operations. Hence, seal members formed on a part through an FIPG application tend to have lower dimensional accuracy. Moreover, LIM forming requires expensive equipment including a special forming machine. Furthermore, in LIM or FIPG methods that include heating the mold to cure the material, it is difficult to work with parts that are easily affected by heat.

As a result, there is a need for a seal member forming apparatus configured to form a seal member having a desired cross-sectional shape on a substrate with high dimensional accuracy.

SUMMARY

An embodiment of the present disclosure is a system for forming a seal member onto a substrate from a material. The system includes a mold comprising an ultraviolet transmissible material, the mold having a first portion and a second portion operatively coupled to the first portion, the first portion having a first cavity, a second cavity, and a channel extending from an outer surface of the mold to the second cavity. The first cavity has a first shape that is complementary to a first side of the substrate and the second cavity has a second shape that is complementary to the seal member. The system also includes an applicator in fluid communication with the channel, where the applicator is configured to provide the material to the second cavity through the channel, and an ultraviolet irradiation device configured to irradiate the mold with ultraviolet light to cure the material when the material is provided to the second cavity, such that the seal member is formed on the substrate.

Another embodiment of the present disclosure is a method of forming a seal member onto a substrate. The method includes placing a first side of the substrate into a first cavity of a first portion of a mold, injecting a material into a second cavity of the first portion of the mold through a channel that extends from the second cavity to an outer surface of the mold, and irradiating the mold with ultraviolet light to cure the material, such that the seal member is formed on the substrate.

BRIEF DESCRIPTION OF THE DRAWINGS

FIG. 9A is an perspective view of a substrate and a mold according to an embodiment of the present disclosure, with the mold in an opened state and the substrate spaced from the mold;

FIG. 9B is a perspective view of the substrate and mold shown in FIG. 9A, with the substrate received in a lower portion of the mold;

FIG. 9C is a perspective view of the mold shown in FIG. 9A, with the mold in a closed state;

FIG. 9D is a perspective view of the substrate and mold shown in FIG. 9A, with the substrate removed from the mold and a seal member formed on the substrate FIG. 10A is a perspective view of first and second molds, with the first mold in an opened state;

FIG. 10B is a perspective view of the first and second molds shown in FIG. 10A, with the substrate received by the lower portion of the first mold;

FIG. 10C is a perspective view of the first and second molds shown in FIG. 10A, with the substrate received by the first mold and the first mold in a closed state;

FIG. 10D is a perspective view of the first and second molds shown in FIG. 10A, with a dispensing device in fluid communication with the first mold;

FIG. 10E is a perspective view of the first and second molds shown in FIG. 10A, with the dispensing device out of fluid communication with the first mold;

FIG. 10F is a perspective view of the first and second molds shown in FIG. 10A, with the first mold in an opened state and the dispensing device in fluid communication with the second mold.

DETAILED DESCRIPTION OF ILLUSTRATIVE EMBODIMENTS

Figure 1:
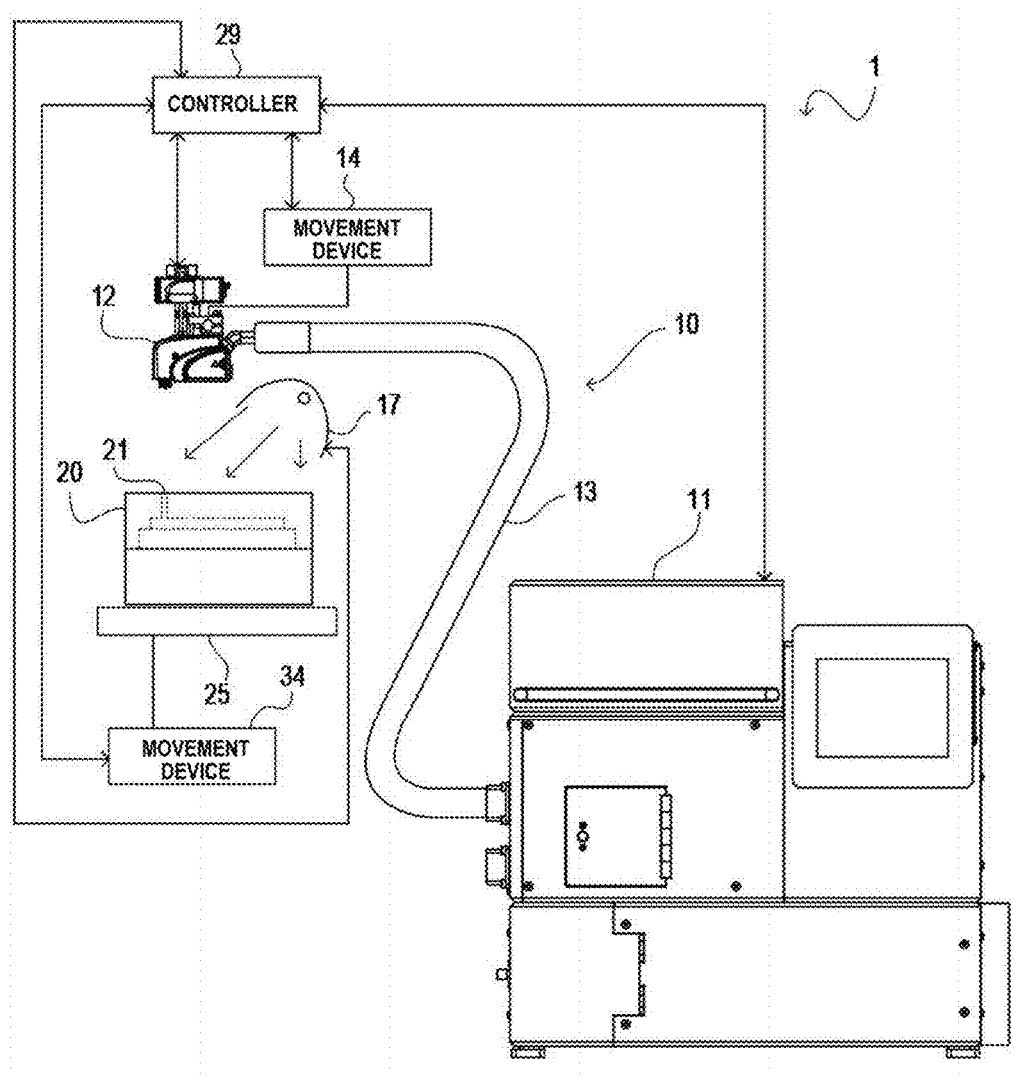
FIG. 1 is a diagram illustrating a seal member forming system according to an embodiment of the present disclosure.

A description based on some embodiments of the disclosure will be provided below by referring to the drawings. It should be noted that the dimensions, the materials, the shapes, and the relative positions of the constituent parts described in the following description of the embodiments are not intended to limit the scope of the disclosure within those specified in the description unless stated otherwise.

FIG. 1 is a diagram illustrating a seal member forming system 1. The seal member forming system 1 is configured to form seal members (seals) on various substrates, including parts of machines such as automobiles, cellular phones, and business machines. The seal member refers to a filler (seal material) disposed between one substrate and another to give air-tightness and/or liquid-tightness to the interstice between the two substrates. The seal member may be a gasket serving as a seal member for fixed portions, where the seal member is configured to give air-tightness and/or liquid-tightness between fixed substrates. Alternatively, the seal member may be a packing serving as a seal member for moving portions, where the packing is configured to give air-tightness and/or liquid-tightness between substrates moving relatively to each other. The seal member forming system 1 includes an applicator 10 and a mold 20. The applicator 10 can include a dispensing device 12 configured to selectively provide the sealing material to the channel 22c of a mold 20, a material supply device 11 configured to store and supply the sealing material to the dispensing device 12, and a hose 13. The material supply device can be any of material supply devices 11, 11', 11", 11'", 11"", or 11""' described below in relation to FIGS. 3-8, respectively. The dispensing device 12 can be a dispensing gun, dispensing head, or other suitable dispensing apparatus for dispensing sealing materials. The hose 13 can serve as a transfer member configured to transfer a material from the material supply device 11 to the dispensing device 12. The hose 13 can connect the material supply device 11 and the dispensing device 12. The seal member forming system 1 can include a movement device 14 configured to transfer the dispensing device 12 from one position to another. The movement device 14 can be configured to move the dispensing device 12 so that the dispensing device 12 is coupled to and decoupled from a channel 22c of a particular mold 20. The hose 13 can be flexible so as to facilitate the movement of the dispensing device 12 by means of the movement device 14. The mold 20 is made from an ultraviolet transmissible material. In one embodiment, the mold 20 is made from an ultraviolet transmissible resin, though other materials are contemplated. The seal member forming system 1 includes an ultraviolet irradiation device 17 configured to irradiate ultraviolet to the mold 20. The applicator 10 may be a manually-operable hand gun configured to store a material and to dispense manually the material. The manually-operable hand gun includes a cylindrical container configured to store material, a piston reciprocally movable in the cylindrical container, a rod attached to the piston, and a trigger configured to drive the rod. When a user pulls the trigger, the rod moves the piston to make the manually-operable hand gun dispense the material to the opening 21 and channel 22c of the mold 20.

As the seal member forming system 1 can include a flexible hose 13 and a movement device 14 that is configured to move the dispensing device 12, the seal member forming system 1 can be readily incorporated in the middle of a series of processes in a production line (i.e., usable as an in-line apparatus). Use of the flexible hose 13 and the movable dispensing device 12 functions to automate a configuration to continuously form seal members 51 on a plurality of substrates 50. The mold 20 can be placed on a movable molding table 25. A movement device 34 can be provided to move the molding table 25. Alternatively, the movement device 34 can move the mold 20 directly in an embodiment without the molding table 25. A controller 29 can be in wired and/or wireless communication with the applicator 10 so as to control the material supply device 11, the dispensing device 12, the movement device 14, the ultraviolet irradiation device 17, and/or the movement device 34.

Figure 2:
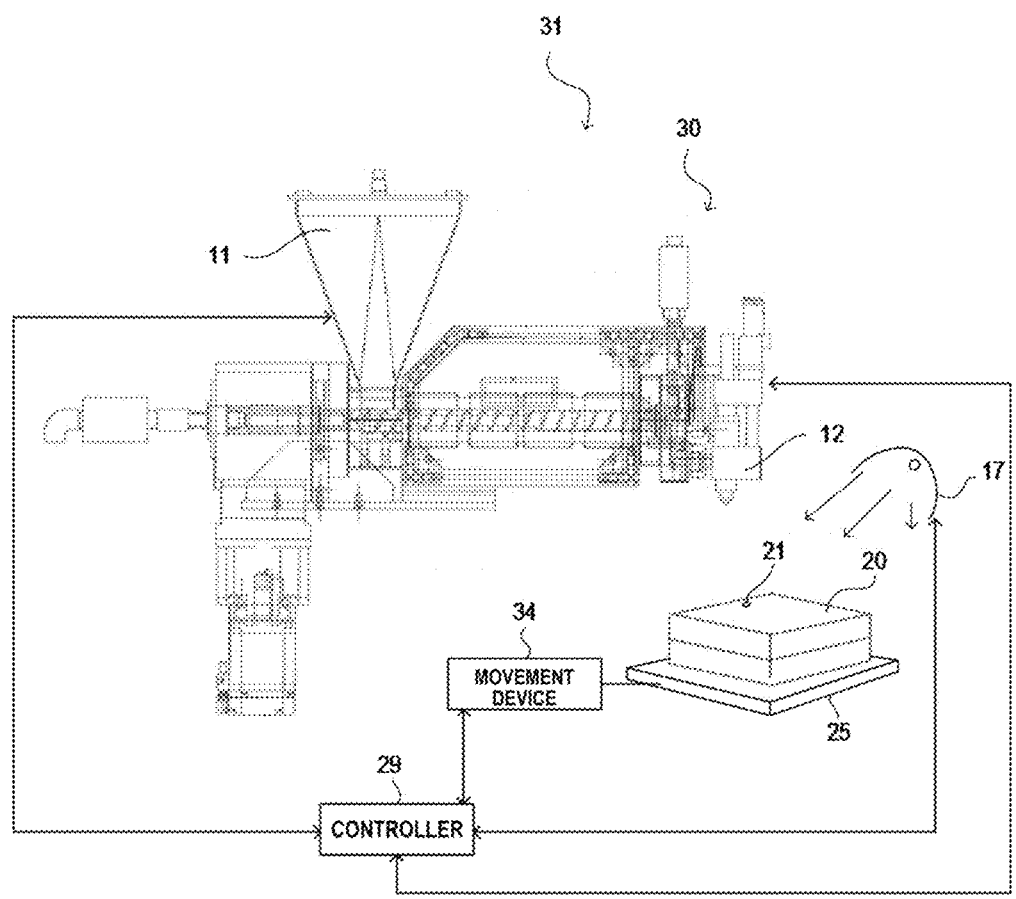
FIG. 2 is a diagram illustrating a seal member forming system according to another embodiment of the present disclosure.

FIG. 2 is a diagram illustrating a different seal member forming system 31. The seal member forming system 31 is a modified example of the seal member forming system 1. The seal member forming system 31 differs from the seal member forming system 1 in that the seal member forming system 31 does not include a hose. The seal member forming system 31 includes an applicator (ultraviolet curing material injection system) 30, which includes a material supply device 11 and a dispensing device 12. Like the seal member forming system 1, the material supply device of seal member forming system 31 can be any of material supply devices 11, 11', 11", 11'", 11"", or 11""' described below in relation to FIGS. 3-8, respectively. The dispensing device 12 can also be a dispensing gun, dispensing head, or other suitable dispensing apparatus for dispensing sealing materials. Instead of including a hose, in the seal member forming system 31 the dispensing device 12 is coupled directly with the material supply device 11 without any hose provided in between. The dispensing device 12 may be coupled to the material supply device 11 via a block and/or a manifold. The seal member forming system 31 can include a movement device 34 configured to move the mold 20. The movement device 34 is configured to move the mold 20 so that the opening 21 of the mold 20 can be selectively coupled to and decoupled from the dispensing device 12. The mold 20 can be placed on a movable molding table 25 that is operatively connected to the movement device 34. As a result, the movement device 34 can be configured to move the molding table 25 and the mold 20. A controller 29 is provided to control the material supply device 11, the dispensing device 12, an ultraviolet irradiation device 17, and the movement device 34. In the configuration described above, the movement device 34 can move the mold 20 to selectively couple the opening 21 to and decouple it from the dispensing device 12. It is, however, also contemplated that the seal member forming system 31 can include a movement device configured to make the applicator 30 and the mold 20 move in relation to each other so as to selectively couple and decouple the dispensing device 12 and the opening 21 to and from each other.

Figure 3:
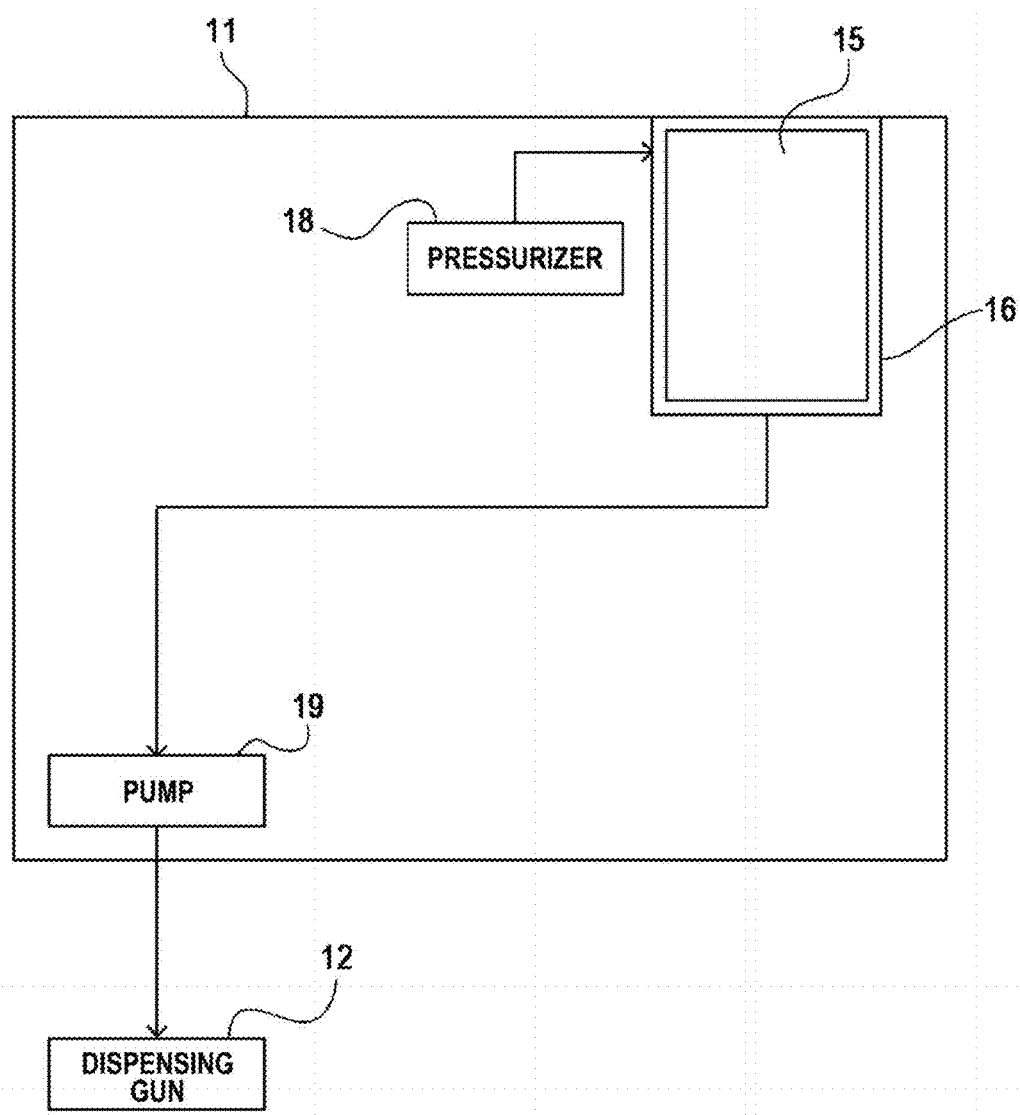
FIG. 3 is a block diagram illustrating a material supply device according to a first embodiment of the present disclosure.

FIG. 3 is a block diagram illustrating a material supply device 11 according to a first embodiment. The material supply device 11 of the first embodiment includes a mount portion 16 configured to detachably mount a cartridge 15, also referred to as an ultraviolet curing material container, that is configured to store an ultraviolet curing material serving as a sealing material. The ultraviolet curing material is a material that is curable in a short time by the energy of the ultraviolet irradiated by the ultraviolet irradiation device 17. Examples of suitable ultraviolet curing materials include an ultraviolet curing resin, such as silicone rubber, polyacrylate, urethane acrylate, and epoxy acrylate. The ultraviolet curing material may be liquid. The material supply device 11 of the first example can include a pressurizer 18 configured to pressurize and push out the ultraviolet curing material in the cartridge 15, which can serve as a material supply source, and can also include a transfer device such as a pump 19 that is configured to transfer the ultraviolet curing material from the cartridge 15 to the dispensing device 12. The pump 19 may be a metering pump or a pressure pump. The pressurizer 18 may send compressed air into the cartridge 15 to pressurize the ultraviolet curing material in the cartridge 15, and thus send the ultraviolet curing material to the pump 19. Alternatively, the pressurizer 18 may use a piston driven by an electric actuator to pressurize the ultraviolet curing material in the cartridge 15, and thus send the ultraviolet curing material to the pump 19. The pump 19 may be a non-positive displacement pump, a positive displacement pump, or a special pump. In another embodiment, the material supply device 11 may have no pressurizer 18. Instead, the material supply device 11 may include a compressor provided as a part of the plant equipment and configured to generate compressed air that is to be supplied into the cartridge 15 via a tube or the like.

The sealing material supply device 11 of the first example includes the pump 19, but may include no pump 19. A possible transfer device configured to transfer the ultraviolet curing material from the sealing material supply device 11 to the dispensing device 12 may include no pump 19 and may send the ultraviolet curing material in the cartridge 15 to the dispensing device 12 by means of only the pressure of the compressed air from the pressurizer 18.

Figure 4:
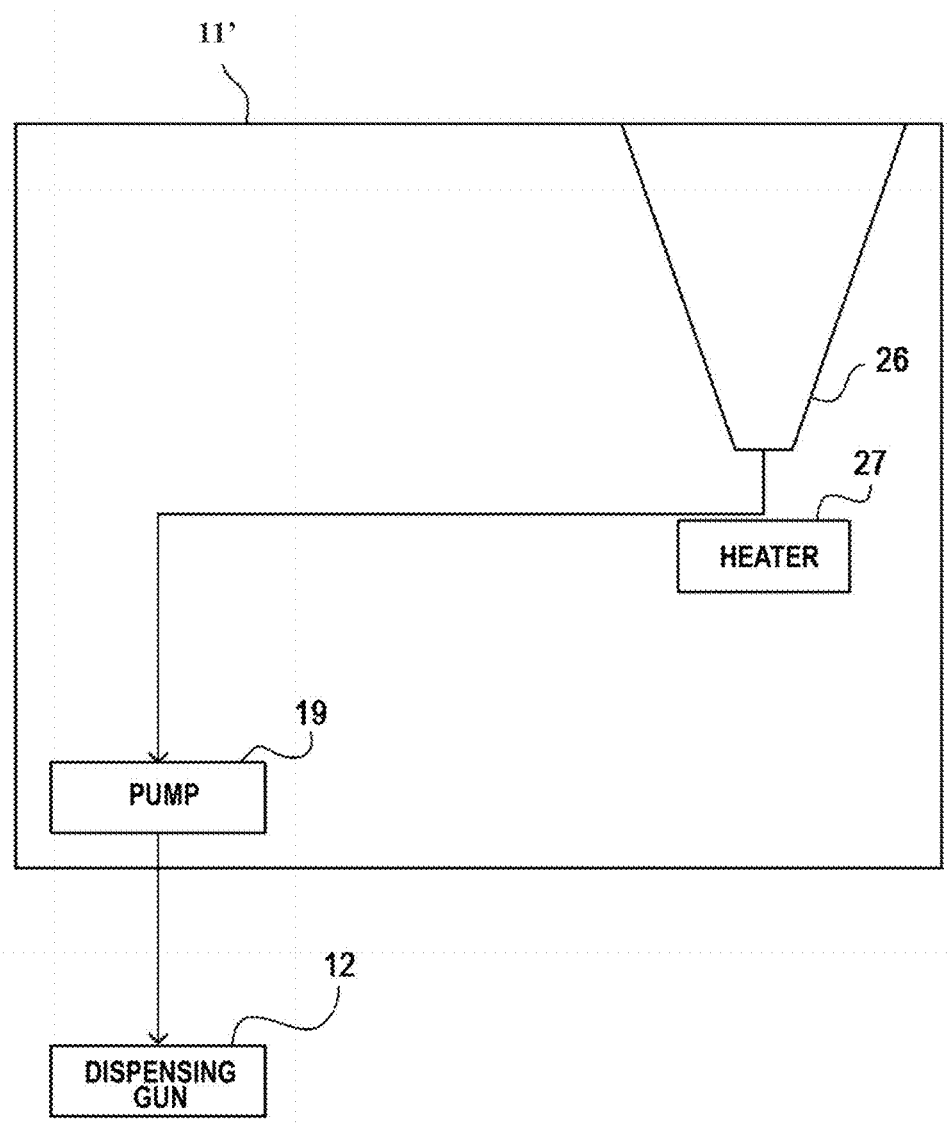
FIG. 4 is a block diagram illustrating a material supply device according to a second embodiment of the present disclosure.

FIG. 4 is a block diagram illustrating a material supply device 11' according to a second embodiment. Unlike the first embodiment of the material supply device 11, the material supply device 11' of the second example includes no mount portion 16, but rather includes a hopper 26 (also referred to as an ultraviolet curing material container, that is configured to store the ultraviolet curing material. The ultraviolet curing material stored in the hopper 26 may be, for example, a liquid or solid in a pellet shape. If the ultraviolet curing material stored in hopper 26 is a solid, the material supply device 11 of the second example may include a heater 27 configured to heat and melt the solid ultraviolet curing material. The material supply device 11' includes a transfer device such as a pump 19 configured to pump the ultraviolet curing material supplied from the hopper 26 to the dispensing device 12. The material supply device 11 of the second example may use, as the sealing material, a polyacrylate material of a type that is heated and then applied. However, other types of materials are contemplated that can be supplied to the hopper 26 in a solid or liquid state.

Figure 5:
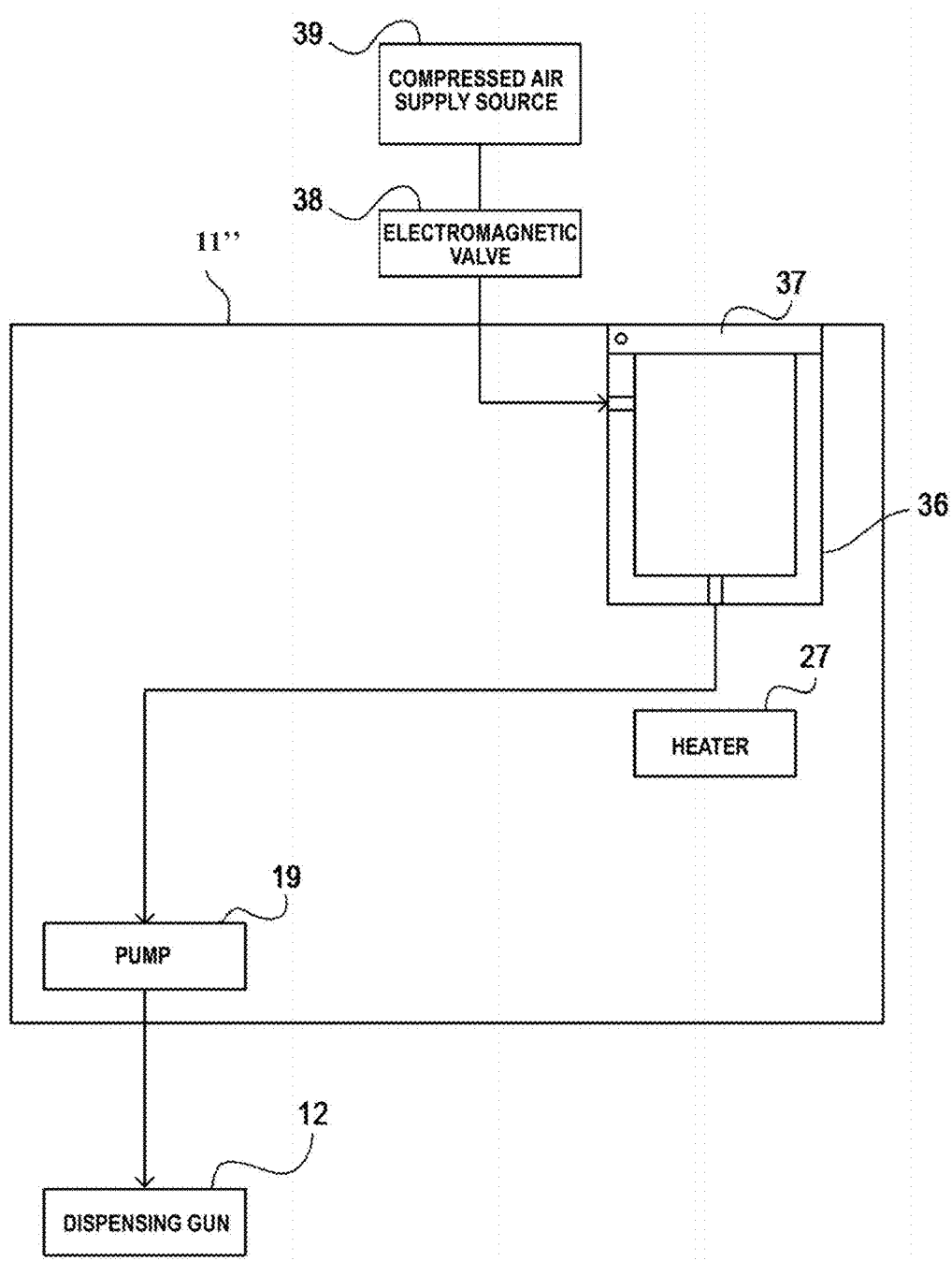
FIG. 5 is a block diagram illustrating a material supply device according to a third embodiment of the present disclosure.

FIG. 5 is a block diagram illustrating a material supply device 11" according to a third embodiment. Unlike the second example, the material supply device 11" of the third embodiment can include no hopper 26, but rather includes a pressure container 36 (also referred to as a pressure pot) that is configured to store an ultraviolet curing material serving. The pressure container 36 can be sealed tightly by an openable lid 37. A compressed air supply source 39 can be provided to supply compressed air to the pressure container 36 via an electromagnetic valve 38 such that the compressed air pressurizes the pressure container 36. The compressed air supply source 39 may be a compressor included in the plant equipment. The compressed air may be replaced by another compressed gas, such as nitrogen gas, noble gases, or similar gases. The supply source of the compressed gas may be a gas cylinder. The ultraviolet curing material stored in the pressure container 36 may be, for example, a liquid or solid in a pellet shape. If the ultraviolet curing material stored in the pressure container 36 is a solid, the material supply device 11" can include a heater 27 configured to heat and melt the solid ultraviolet curing material. The material supply device 11 can include transfer device such as a pump 19 configured to pump the ultraviolet curing material having from the pressure container 36 to the dispensing device 12. The material supply device 11" can include the pump 19, but may alternatively include no pump. Instead, a possible transfer device configured to transfer the ultraviolet curing material from the material supply device 11 to the dispensing device 12 may send the ultraviolet curing material in the pressure container 36 to the dispensing device 12 by means of only the pressure of the compressed air from the compressed air supply source 39. The material supply device 11" of may use, as the sealing material, a polyacrylate material of a type that is heated and then applied. However, other types of sealing materials are also contemplated.

Figure 6:
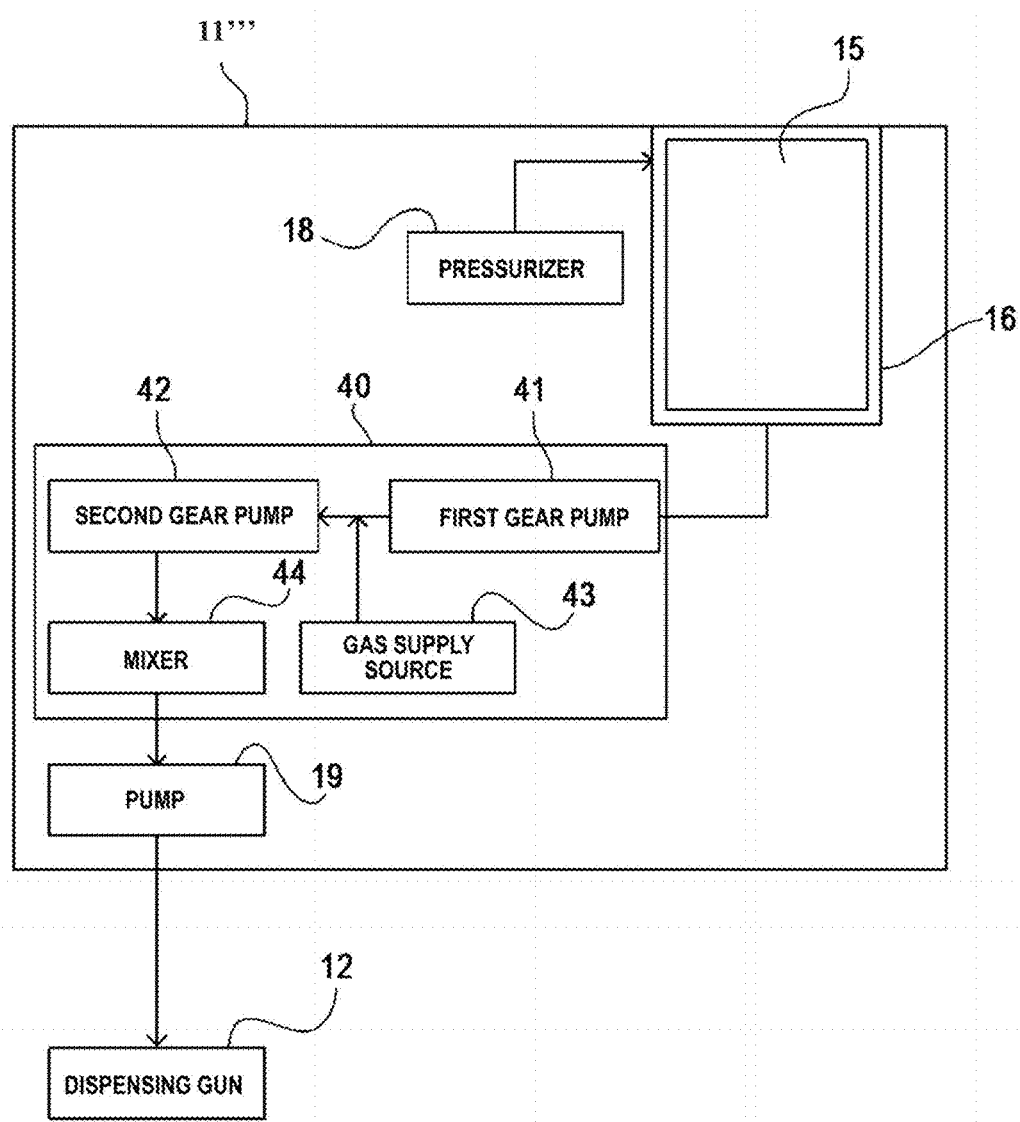
FIG. 6 is a block diagram illustrating a material supply device according to a fourth embodiment of the present disclosure.

FIG. 6 is a block diagram illustrating a material supply device 11''' according to a fourth embodiment. The material supply device 11''' is the material supply device 11 of the first example illustrated in FIG. 3, but further including a foam generation device 40. The foam generation device 40 can be configured to generate a foamable sealing material that cures due to exposure to ultraviolet light. The foamable sealing material can be created by mixing a gas into the sealing material. Such gasses can include dry air, carbon dioxide gas, or the like gases, as well as an inert gas such as nitrogen gas. The foamable sealing material can be kept in a mixture state (liquid state) as long as the foamable sealing material is kept, at least, at a critical pressure where the gas dissolved in the sealing material starts to foam. Placing the foamable sealing material under the atmospheric pressure makes the sealing material generate the gas in the form of small bubbles to form a foam, the volume of which expands due to the generation of additional bubbles and/or the enlargement of the generated bubbles. Use of the foamable sealing material allows a foam seal member 51 to be formed on a substrate 50. The foam seal member 51 is easily deformable as to improve the sealing performance between substrates.

The foam generation device 40 can include a first gear pump 41, a second gear pump 42, a gas supply source 43, and a mixer 44. The first gear pump 41 can be configured to pump out the material from the cartridge 15 to the second gear pump 42. The gas supply source 43 is configured to introduce a gas into the material at a section between the first gear pump 41 and the second gear pump 42. Making the flow rate of the first gear pump 41 and that of the second gear pump 42 different from each other can allow the gas from the gas supply source 43 to be introduced into the material. The mixer 44 is configured to receive the material containing the gas having been introduced from the second gear pump 42, and then to mix a gas into the material to convert the material to a foamable sealing material. A pump 19 is provided to receive the foamable sealing material from the mixer 44 and then to supply the foamable sealing material to a dispensing device 12. Forming the seal member 51 by use of the foamable sealing material generated by the foam generation device 40 can allow the shape error of the seal member 51 to be absorbed by the deformation of the foam. Utilizing the foam generation device 40 allows not only a silicone rubber but also a polyacrylate material to be used as the sealing material.

Figure 7:
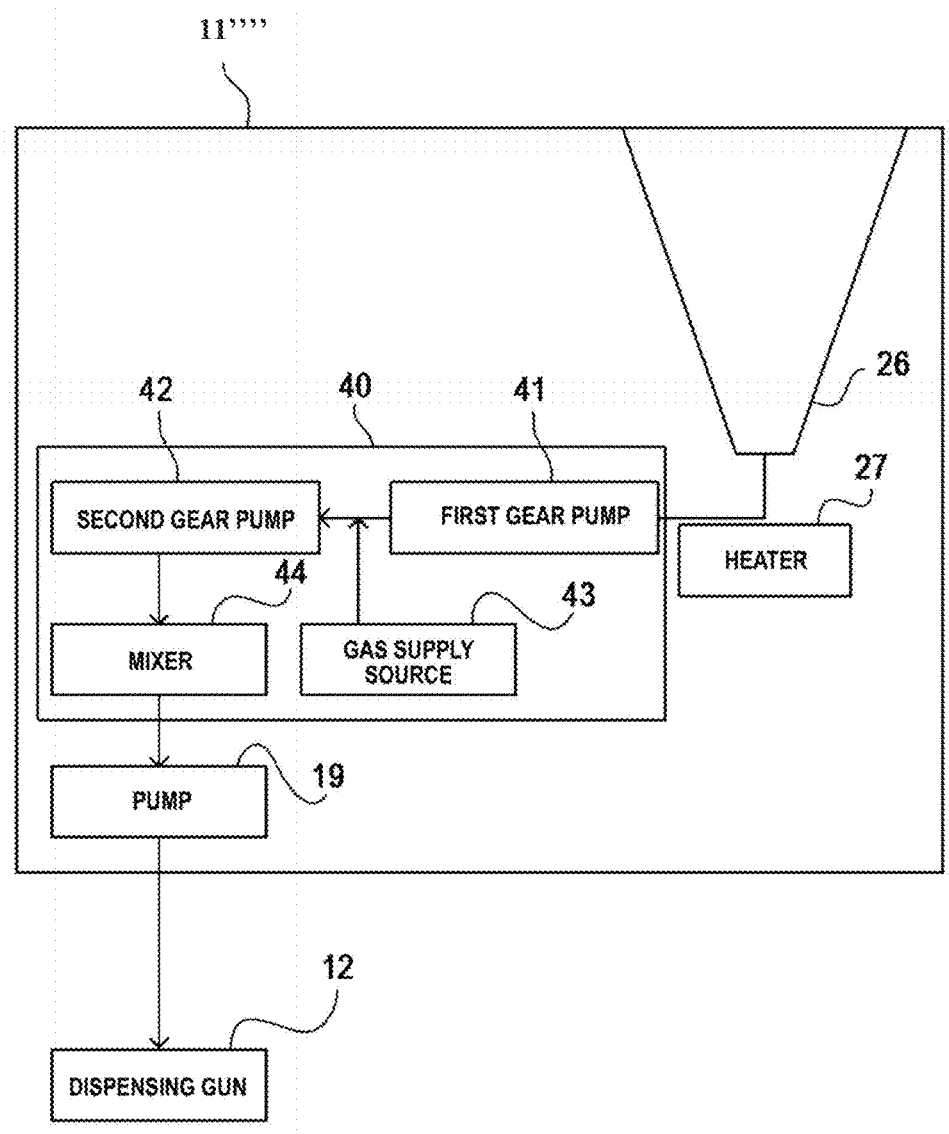
FIG. 7 is a block diagram illustrating a material supply device according to a fifth embodiment of the present disclosure.

FIG. 7 is a block diagram illustrating a material supply device 11"" according to a fifth embodiment. The material supply device 11"" is the material supply device 11' illustrated in FIG. 4, further including a foam generation device 40. The foam generation device 40 of this example is similar to the foam generation device 40 of the material supply device 11''' illustrated in FIG. 6. Hence, no further description will be provided here. The material supply device 11"" may use, as the sealing material, a polyacrylate gasket material that is to be heated to foam.

Figure 8:
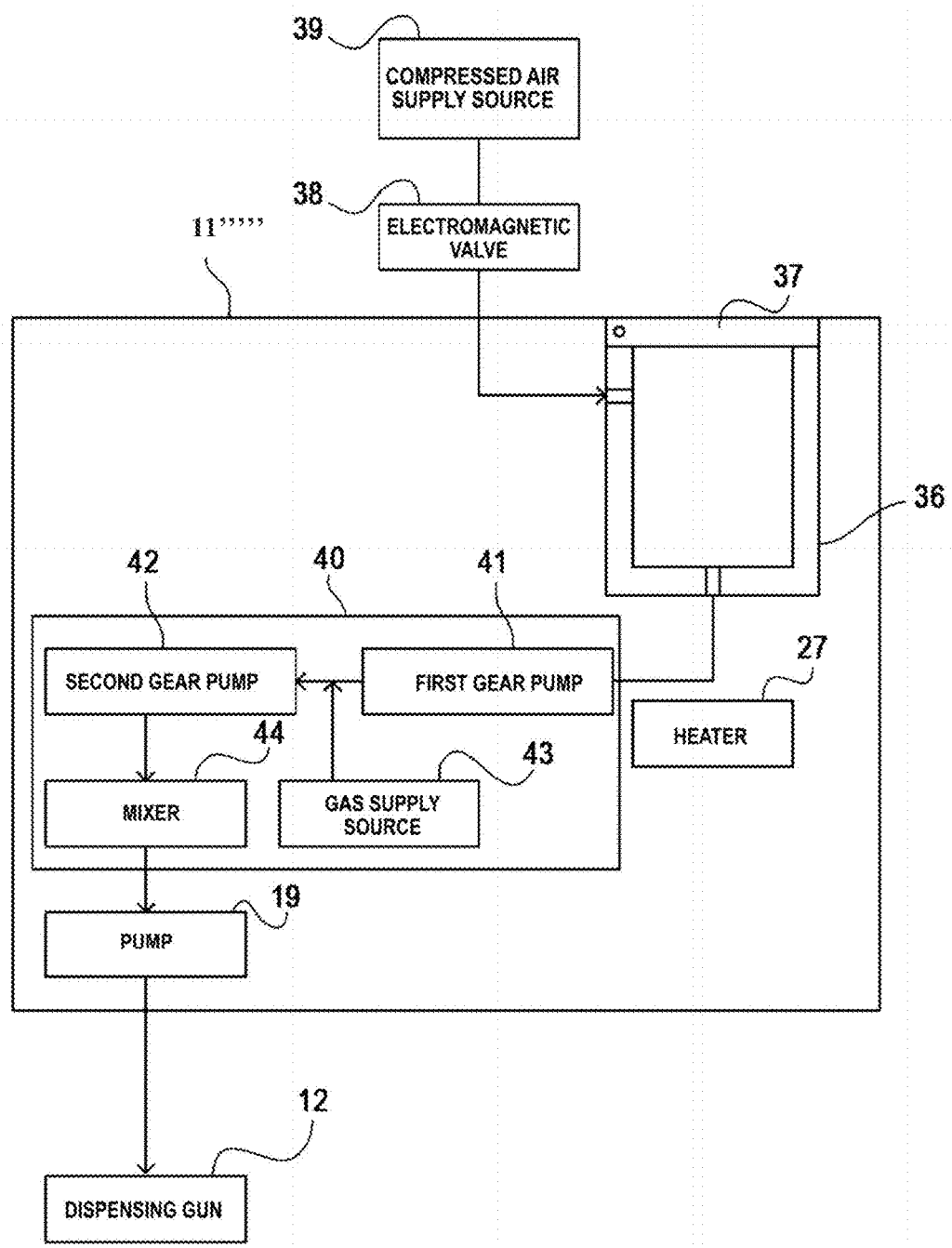
FIG. 8 is a block diagram illustrating a material supply device according to a sixth embodiment of the present disclosure.

FIG. 8 is a block diagram illustrating a material supply device 11''''' according to a sixth embodiment. The material supply device 11''''' is the material supply device 11'' illustrated in FIG. 5, further including a foam generation device 40. The foam generation device 40 of this example is similar to the foam generation device 40 of the material supply device 11''' illustrated in FIG. 6. Hence, no further description will be provided here. The material supply device 11''''' of the sixth example may use, as the sealing material, a polyacrylate gasket material that is to be heated to produce foam.

FIGS. 9A-9D are explanatory drawings illustrating the mold 20. FIG. 9A is a drawing illustrating the mold 20 in an opened state. The mold 20 can have a first portion 22 and a second portion 23 opposite to the first portion 22. The first and second portions 22, 23 are operatively coupled to each other such that the mold 20 can be transitioned between an open position, where a substrate 50 can be inserted into and removed from the mold 20, and a closed position, where the substrate 50 is encapsulated within the mold 20. The first portion 22 can be an upper portion of the mold 20 and the second portion 23 can be a lower portion of the mold 20, though other configurations are contemplated. The mold 20 can also have an outer surface 24 that defines the outer perimeter of the mold 20. The substrate 50 is a part intended to be used in such various machines as cellular phones, business machines, and other electronic devices. The substrate 50 illustrated in FIG. 9 is a plate-shape base board, but it is contemplated that the substrate 50 may have various other shapes. The substrate 50 can have a first side 50a and a second side 50b opposite the first side 50a. In the depicted embodiment, the first side 50a can be an upper side and the second side 50b can be a lower side, though different configurations are contemplated. In the depicted embodiments, the first side 50a of the substrate 50 is where the seal member 51 is intended to be formed. The second portion 23 can hold the second side 50b of the substrate 50, that is, the opposite side to the first side 50a where the seal member 51 is to be formed. To hold the substrate 50, the second portion 23 may preferably have a third cavity 23a having a complementary shape to the shape of the second side 50b of the substrate 50. In other embodiments, the second portion 23 may comprise a flat surface with no third cavity 23a formed therein.

The first portion 22 has a first cavity 22a having a complementary shape to the shape of the first side 50a (including the region where the seal member 51 is to be formed) of the substrate 50 and a second cavity 22b for forming the seal member 51. The first cavity 22a and the second cavity 22b can be in communication with each other. The second cavity 22b is in communication with an opening 21 via a channel 22c, where the opening 21 is formed on the outer surface 24 of the mold 20. The second cavity 22b may preferably be formed to have a continuous and endless annular shape. However, other shapes are contemplated for the second cavity 22b, as the shape of the second cavity 22b will depend upon the intended shape of the seal member 51. Forming the second cavity 22b to have various cross-sectional shapes allows the seal member to be formed to have a cross section with various aspect ratios. The first portion 22 and the second portion 23 are made from an ultraviolet transmissible material. The second portion 23, however, does not have to be made from an ultraviolet transmissible material. Some exemplar ultraviolet transmissible materials are glass and ultraviolet transmissible acrylic resin. If the mold 20 is made from certain materials, such as an ultraviolet transmissible acrylic resin through a machining work, a polishing work can be performed on the outer surface 24 of the mold 20 to prevent the ultraviolet light from being reflected on the surfaces of the mold 20. However, these of a different mold in the manufacturing of the mold 20 from an ultraviolet transmissible acrylic resin can eliminate the need to polish the outer surface 24 of the mold 20.

The substrate 50 can be held in the third cavity 23a of the second portion 23. FIG. 9B is a drawing illustrating the substrate 50 held in the third cavity 23a of the second portion 23. When the first portion 22 is closed, the first side 50a of the substrate 50 is accommodated in the first cavity 22a of the first portion 22. FIG. 9C is a drawing illustrating the mold 20 with the first portion 22 being in a closed state. When the mold 20 is in the closed state, the dispensing device 12 of the applicator 10 dispenses the sealing material to the opening 21 of the first portion 22. The dispensed sealing material passes through the opening 21 and the channel 22c, and is then injected into the second cavity 22b. The ultraviolet irradiation applied to the mold 20 by means of the ultraviolet irradiation device 17 allows the sealing material to be cured in a short time. Opening the first portion 22 can allow the user to take the substrate 50 out of the mold 20. FIG. 9D illustrates a substrate 50 with a seal member 51 formed thereon that has been taken out of the mold 20 by opening the first portion 22 relative to the second portion 23. The seal member 51 can then be disposed between the substrate 50 and another substrate (not shown) to serve as a gasket or a packing.

The seal member 51 may be bonded to the substrate 50 so as to prevent the seal member 51 from being removed easily. Alternatively, the seal member 51 may be adhered to the substrate 50 with an adhesive strength that is weak enough to allow the seal member 51 to be removed from the substrate 50 through manual pulling. The seal member 51 may be adhered to the substrate 50 just firmly enough to be kept adhered on the substrate 50 when the substrate 50 is connected to another substrate.

Figure 11:
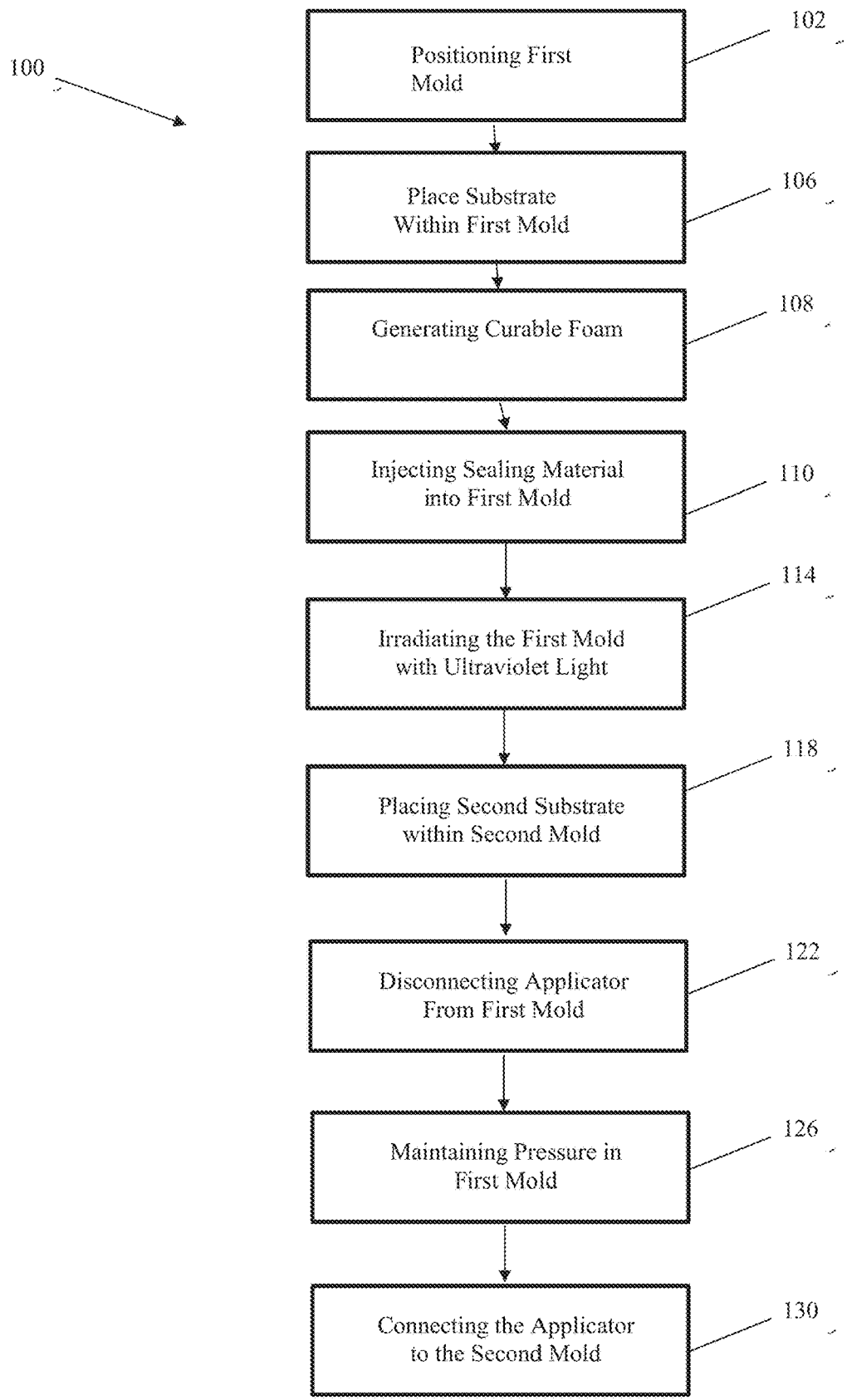
FIG. 11 is a process flow diagram showing a method of forming a seal member onto a substrate according to an embodiment of the present disclosure.

FIGS. 10A-10F are diagrams illustrating a method 100 of forming the seal member 51 onto the substrate 50, which is further depicted in the process flow diagram depicted in FIG. 11. First, in step 102, the mold 20 is positioned within the seal member forming system 1, 31, as illustrated in FIG. 10A. In step 102, the mold 20 can be placed on the molding table 25. The movement device 34 can allow the molding table 25 to move in the right-and-left direction. As illustrated in FIG. 10A, the first portion 22 is opened in step 102. In step 106, the substrate 50 is placed within the mold 20. As illustrated in FIG. 10B, this can include placing the substrate 50 on top of the second portion 23, such that a second side 50b of the substrate 50 is placed within a third cavity 23a of the second portion 23 of the mold 20, where the third cavity 23a has a shape that is complementary to the second side 50b of the substrate 50. Additionally, as illustrated in FIG. 10C, step 106 can include closing the first portion 22 of the mold 20 relative to the second portion 23, thus placing the first side 50a of the substrate 50 within the first cavity 22a of the first portion 22 of the mold 20, where the first cavity 22a has a shape that is complementary to the first side 50a of the substrate 50. Then, the molding table 25 can be moved in a first direction as illustrated by the arrow. Optionally, in step 108 a foam generation device 40 can be utilized to generate a curable foam by mixing the sealing material with a gas, as described above. Next, as illustrated in FIG. 10D, in step 110 the movement device 14 can lower the dispensing device 12 to couple the nozzle of the dispensing device 12 to the opening 21 of the first portion 22. Step 110 can include transferring the sealing material from the material supply device 11 to the dispensing device 12 using a pump, or alternatively using compressed air. The applicator 10, and particularly the dispensing device 12, then injects the sealing material into the second cavity 22b of the first portion 22 of the mold 20 through the channel 22c. Then, in step 114, the ultraviolet irradiation device 17 irradiates the mold 20 with ultraviolet light to cure the sealing material, such that the seal member 51 is formed on the substrate 50. In step 118, which may be performed simultaneously with step 114, the first portion 22 of the next mold 20 on the right of the above-mentioned first mold can be opened and another substrate 50 can be placed on top of the second portion 23 of the second mold 20 (as shown in FIG. 10D).

In step 122 and as illustrated in FIG. 10E, the movement device 14 can then disconnect the applicator 10, particularly the dispensing device 12, from the first mold 20, such that the dispensing device 12 and the first mold 20 are no longer in fluid communication. At this time, the first mold 20 on the left-hand side is being cooled, and the first portion 22 of the mold 20 on the right-hand side is closed. After the applicator 10 is disconnected in step 122, an elevated pressure of the sealing material within the first mold 20 can be maintained in step 126. The elevated pressure can be maintained through the use of a stop valve incorporated in the opening 21. Alternatively, the pressure of the material may be held by curing the ultraviolet curing material near the opening 21 by the ultraviolet irradiation. Further, the pressure of the sealing material may be held by stopping up the channel 22c with a movable piece provided in the mold 20. The molding table 25 can then be moved in a second direction as illustrated by the arrow in step 130, such that the first mold 20 is moved away from the applicator 10 and the second mold 20 is moved towards the applicator 10. As illustrated in FIG. 10F, the first portion 22 of the mold 20 on the left-hand side is opened. The seal member 51 is found formed on the substrate 50. Then, the substrate 50 with the seal member 51 formed thereon can be taken out, and then another substrate 50 placed on top of the second portion 23. Step 130 can also include connecting the applicator 10, specifically the dispensing device 12, to the second mold 20, such that the applicator 10 is in fluid communication with a second cavity 22b and a channel 22c of the second mold 20. The dispensing device 12 then can inject the sealing material into the second mold 20 on the right-hand side. In this way, seal members 51 are formed consecutively on a plurality of substrates 50. If the flexible hose 13 and the movable dispensing device 12 are used, a configuration to consecutively form seal members 51 on a plurality of substrates 50 is readily automated.

It should be noted that in other embodiments the relative positions of the first portion 22 and the second portion 23 may be switched. In such a case, the substrate 50 is placed in the first cavity 22a that faces upwards, and the substrate 50 is held by the second portion 23. The dispensing device 12 can then be coupled to the opening 21, which faces downwards, and then inject the sealing material upwards from below. Also, in this embodiment, the seal member 51 may be formed on the substrate 50 in a similar manner.

In the above described systems and method, the ultraviolet irradiation device 17 can irradiate the entirety of the outer surface 24 of the mold 20 with the emitted ultraviolet light. In one embodiment, the ultraviolet irradiation device 17 can be an ultraviolet lamp such as an extra-high-pressure mercury lamp, a high-pressure mercury lamp, a low-pressure mercury lamp, a metal halide lamp, an excimer lamp, an excimer fluorescent lamp, and other similar ultraviolet lamps. The ultraviolet irradiation device 17 may include, in lieu of or in addition to the ultraviolet lamp, an LED-type light source, and can be configured to move the LED-type light source so as to make the LED-type light source scan over the mold 20. For example, the ultraviolet irradiation device 17 may be configured to move along the contour of the seal member 51.

The seal member forming system 1 or 31 of the embodiment may be incorporated into an existing production line for manufacturing the substrate 50, and thus implement the automated consecutive formation of seal members 51 on the plurality of substrates 50. Forming the second cavity 22b configured to form the seal member 51 allows the aspect ratio of the cross-sectional shape of the seal member 51 to be set as desired, which allows the seal member 51 to have a more freely selected shape. Hence, the seal member 51 may have an enhanced degree of freedom for its shape and may be formed with higher accuracy with respect to its shape. As the ultraviolet curing material is cured by a short-time irradiation of the ultraviolet, the disclosure may be applied to even a seal-member formation on a part that is easily affected by heat.

This embodiment provides a seal member forming system that is readily automated, a relevant seal member forming method, and a relevant applicator. In addition, this embodiment provides a seal member forming system configured to form a seal member having a desired cross-sectional shape on a substrate with higher dimensional accuracy, a relevant seal member forming method, and a relevant applicator. Moreover, the embodiment provides a seal member forming system configured to form a seal member on a substrate that is easily affected by heat, a relevant seal member forming method, and a relevant applicator.

It should be noted that the disclosure should not be limited to the above-described embodiment and that the disclosure may be carried out in various other forms without departing from the characteristic features of the disclosure. Hence, the above-described embodiment is only an illustrative example in every and each aspect and should never be understood as a limiting example. The scope of the disclosure should be defined by the claims, and what is stated in the Description puts no restrictions whatsoever on the scope of the disclosure. In addition, any modifications and changes that belong to the equivalents of the claims should be understood as being within the scope of the disclosure.

What is claimed:

1. A system for forming a seal member onto a substrate from a sealing material, comprising:
   a mold comprising an ultraviolet transmissible material, the mold having a first portion and a second portion operatively coupled to the first portion, the first portion defining a first cavity in an inner surface thereof, a second cavity in the inner surface thereof, and a channel extending from an outer surface of the mold to the second cavity, where the first cavity has a first shape that is complementary to a first side of the substrate and the second cavity has a second shape that is complementary to the seal member;
   an applicator in fluid communication with the channel of the mold, wherein the applicator is configured to inject the sealing material into the second cavity through the channel; and
   an ultraviolet irradiation device configured to irradiate the mold with ultraviolet light to cure the sealing material when the sealing material is provided to the second cavity, such that the seal member is formed on the substrate.

2. The system of claim 1, wherein the first cavity is in communication with the second cavity.

3. The system of claim 1, wherein the second cavity has an annular shape.

4. The system of claim 1, wherein the sealing material is a silicone rubber, polyacrylate, urethane acrylate, or epoxy acrylate.

5. The system of claim 1, wherein the mold is a first mold, the system further comprising:
   a movement device configured to 1) move the first mold out of fluid communication with the applicator and 2) move a second mold into fluid communication with the applicator.

6. The system of claim 1, wherein the ultraviolet irradiation device includes an ultraviolet lamp or an LED.

7. The system of claim 1, wherein the second portion of the mold defines a third cavity that has a third shape, the third shape being complementary to a second side of the substrate that is opposite the first side.

8. The system of claim 1, wherein the applicator comprises:
   a dispensing device configured to selectively provide the sealing material to the channel of the mold;
   a material supply device configured to store and supply the sealing material to the dispensing device; and
   a transfer device configured to transfer the sealing material from the material supply device to the dispensing device.

9. The system of claim 8, wherein the transfer device is a pump.

10. The system of claim 8, wherein the transfer device is configured to transfer the sealing material to the dispensing device using compressed air.

11. The system of claim 8, further comprising:
    a foam generation device configured to mix the sealing material with a gas to generate a curable foam.

12. The system of claim 8, further comprising:
    a movement device configured to selectively move the dispensing device into and out of fluid communication with the channel of the mold.

* * * * *